United States Patent
Leard et al.

(10) Patent No.: US 9,625,108 B2
(45) Date of Patent: Apr. 18, 2017

(54) AUXILIARY LIGHT SOURCE ASSOCIATED WITH AN INDUSTRIAL APPLICATION

(71) Applicant: Rockwell Automation Technologies, Inc., Mayfield Heights, OH (US)

(72) Inventors: Francis L. Leard, Sudbury, MA (US); Dennis Mackey, Ipswich, MA (US); Nicholas Cottreau, Billerica, MA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 14/509,466

(22) Filed: Oct. 8, 2014

(65) Prior Publication Data

US 2016/0102817 A1    Apr. 14, 2016

(51) Int. Cl.
*F21S 4/00* (2016.01)
*F21K 99/00* (2016.01)
*F21K 9/64* (2016.01)
*F21W 131/40* (2006.01)
*F21V 8/00* (2006.01)
*F21Y 101/00* (2016.01)

(52) U.S. Cl.
CPC .............. *F21K 9/56* (2013.01); *F21K 9/64* (2016.08); *F21W 2131/40* (2013.01); *F21Y 2101/00* (2013.01); *G02B 6/0008* (2013.01)

(58) Field of Classification Search
CPC .. G02B 6/0003; G02B 6/0011; G02B 6/0008; F21K 9/56; F21K 9/64; F21W 2131/40; F21Y 2101/00
USPC ........................................................ 362/583
See application file for complete search history.

(56) References Cited

U.S. PATENT DOCUMENTS

| | | | | | |
|---|---|---|---|---|---|
| 4,967,317 | A | * | 10/1990 | Plumly | G09F 13/06 362/243 |
| 5,029,008 | A | * | 7/1991 | Ferren | G06K 7/12 250/271 |
| 5,075,823 | A | * | 12/1991 | Chomyn | F21V 9/02 362/2 |
| 6,235,148 | B1 | * | 5/2001 | Courson, Jr. | C09J 5/00 156/272.2 |
| 6,517,213 | B1 | * | 2/2003 | Fujita | G09F 13/04 362/23.18 |

(Continued)

FOREIGN PATENT DOCUMENTS

| CN | 1437063 A | 8/2003 |
|---|---|---|
| CN | 102447882 | 5/2012 |

(Continued)

OTHER PUBLICATIONS

Notice of Allowance for U.S. Appl. No. 14/553,431, dated Oct. 8, 2015, 25 pages.

(Continued)

*Primary Examiner* — Bryon T Gyllstrom
(74) *Attorney, Agent, or Firm* — Amin, Turocy & Watson, LLP

(57) ABSTRACT

Systems and techniques for providing an auxiliary light source associated with an industrial application are presented. A luminescent label is attached to an optical assembly via a pressure sensitive adhesive. The luminescent label comprises at least a fluorophore layer configured to transform light received from a light source into output light that is projected the optical assembly.

20 Claims, 15 Drawing Sheets

LIGHT 108 FROM LIGHT SOUCE

(56) References Cited

U.S. PATENT DOCUMENTS

| | | | |
|---|---|---|---|
| 7,255,691 B2 * | 8/2007 | Tolkoff | A61N 5/06 313/483 |
| 7,355,179 B1 | 4/2008 | Wood et al. | |
| 7,796,820 B2 | 9/2010 | Simon et al. | |
| 8,224,032 B2 | 7/2012 | Fuchs et al. | |
| 8,253,792 B2 | 8/2012 | Wells et al. | |
| 8,421,037 B2 | 4/2013 | Leard | |
| 8,480,246 B2 | 7/2013 | Leard | |
| 8,531,308 B2 * | 9/2013 | Dickie | 340/461 |
| 9,251,598 B2 | 2/2016 | Wells et al. | |
| 2002/0061134 A1 | 5/2002 | Cofer et al. | |
| 2002/0186299 A1 | 12/2002 | Cofer | |
| 2004/0041984 A1 * | 3/2004 | Tani | F21V 7/0091 353/20 |
| 2004/0095996 A1 | 5/2004 | Mossakowski | |
| 2004/0150991 A1 * | 8/2004 | Ouderkirk | H01L 33/46 362/231 |
| 2004/0150997 A1 * | 8/2004 | Ouderkirk | H01L 33/505 362/255 |
| 2004/0233416 A1 | 11/2004 | Doemens et al. | |
| 2005/0207618 A1 | 9/2005 | Wohler et al. | |
| 2006/0227317 A1 | 10/2006 | Henderson et al. | |
| 2007/0217670 A1 | 9/2007 | Bar-Am | |
| 2008/0007709 A1 | 1/2008 | Bamji et al. | |
| 2008/0013821 A1 | 1/2008 | Macgregor et al. | |
| 2008/0144000 A1 | 6/2008 | Thun et al. | |
| 2008/0302951 A1 | 12/2008 | Aoki et al. | |
| 2009/0079841 A1 | 3/2009 | Leard et al. | |
| 2009/0129115 A1 * | 5/2009 | Fine | G02B 6/0021 362/606 |
| 2009/0245651 A1 | 10/2009 | Friedhoff et al. | |
| 2009/0257241 A1 * | 10/2009 | Meinke | B60Q 1/2669 362/546 |
| 2010/0128109 A1 | 5/2010 | Banks | |
| 2010/0136302 A1 * | 6/2010 | Comanzo | C09K 11/7786 428/195.1 |
| 2010/0207762 A1 | 8/2010 | Lee et al. | |
| 2011/0050878 A1 | 3/2011 | Wells et al. | |
| 2011/0051119 A1 | 3/2011 | Min et al. | |
| 2012/0106791 A1 | 5/2012 | Lim | |
| 2012/0146789 A1 | 6/2012 | De Luca et al. | |
| 2012/0146792 A1 | 6/2012 | De Luca et al. | |
| 2012/0293625 A1 | 11/2012 | Schneider et al. | |
| 2012/0330447 A1 | 12/2012 | Gerlach et al. | |
| 2013/0038882 A1 | 2/2013 | Umeda et al. | |
| 2013/0044310 A1 | 2/2013 | Mimeault | |
| 2013/0094705 A1 | 4/2013 | Tyagi et al. | |
| 2013/0155723 A1 * | 6/2013 | Coleman | G02B 6/0018 362/621 |
| 2013/0182114 A1 | 7/2013 | Zhang et al. | |
| 2013/0194776 A1 | 8/2013 | Santos et al. | |
| 2013/0300835 A1 | 11/2013 | Kinoshita et al. | |
| 2014/0055771 A1 | 2/2014 | Oggier | |
| 2014/0294245 A1 | 10/2014 | Siilats | |
| 2015/0043787 A1 | 2/2015 | Fredrich et al. | |

FOREIGN PATENT DOCUMENTS

| | | |
|---|---|---|
| DE | 102006048166 | 2/2008 |
| DE | 102012021375 | 5/2013 |
| EP | 0835460 | 4/1998 |
| GB | 2319426 | 5/1998 |
| KR | 20130008469 | 1/2013 |
| WO | 2008152647 | 12/2008 |
| WO | 2013135608 | 9/2013 |

OTHER PUBLICATIONS

Extended European Search Report for EP Application Serial No. 15168239.0, dated Oct. 5, 2015, 10 pages.
Extended European Search Report for EP Application Serial No. 15168119.4, dated Oct. 26, 2015, 9 pages.
Extended European Search Report for EP Application Serial No. 15168237.4, dated Nov. 12, 2015, 8 pages.
European Office Action for EP Application Serial No. 15168237.4, dated Dec. 21, 2015, 2 pages.
European Office Action for EP Application Serial No. 15168239.0, dated Nov. 30, 2015, 2 pages.
European Office Action for EP Application Serial No. 15168119.4, dated Nov. 30, 2015, 2 pages.
Chinese Office Action dated Aug. 19, 2016 for Chinese Application Serial No. 201510256225.8, 7 pages.
Office Action for U.S. Appl. No. 14/525,125, dated Oct. 21, 2016, 76 pages.
Notice of Allowance for U.S. Appl. No. 14/943,246, dated Jun. 29, 2016, 42 pages.
Extended European Search Report for EP Application Serial No. 15168241.6, dated Mar. 7, 2016, 8 pages.
Office Action for U.S. Appl. No. 14/553,363, dated Nov. 4, 2016, 33 pages.

* cited by examiner

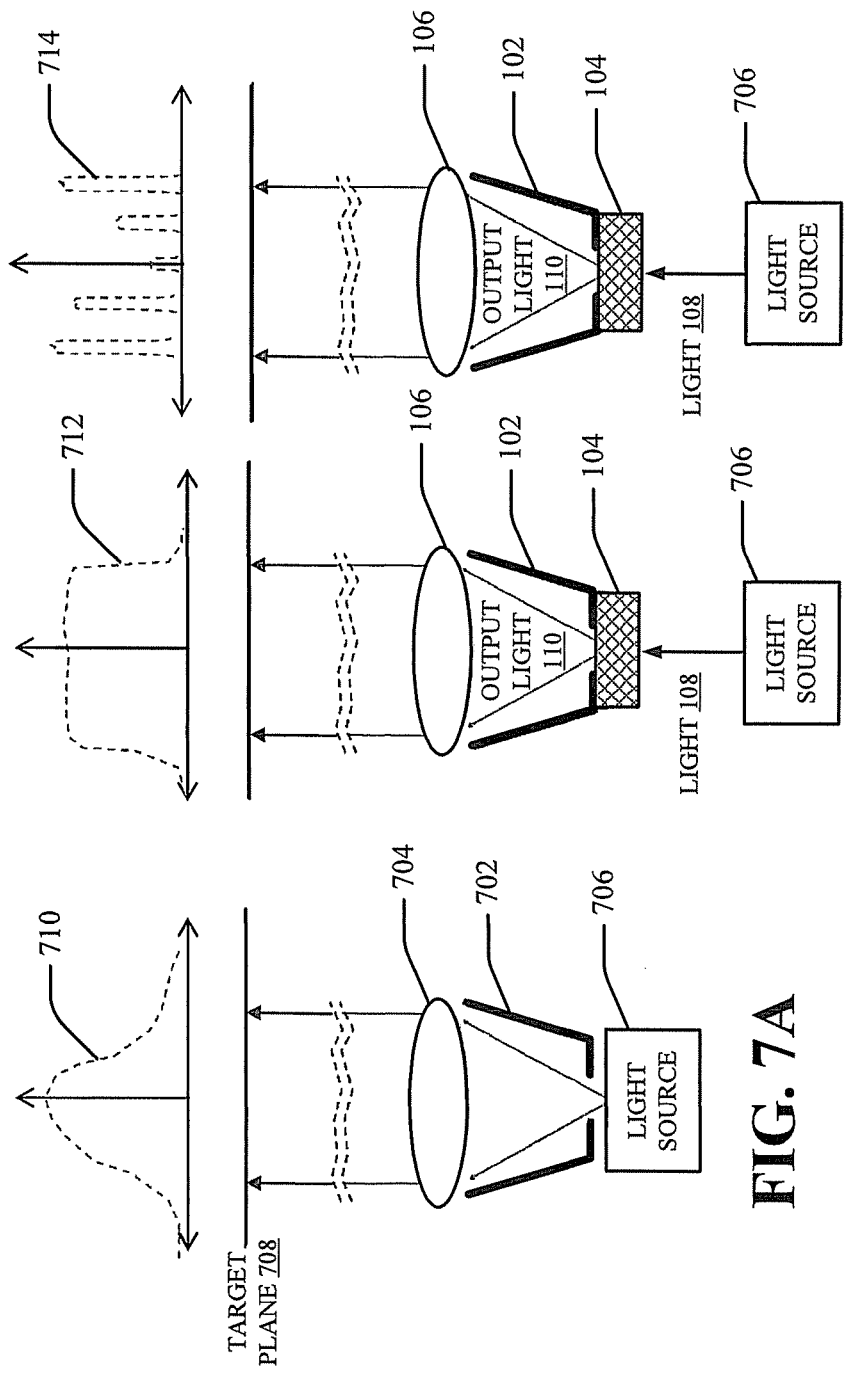

AUXILIARY LIGHT SOURCE ASSOCIATED WITH AN INDUSTRIAL APPLICATION

BACKGROUND

The subject matter disclosed herein relates generally to industrial automation equipment, and, more particularly, to sourcing and/or indication associated with an industrial application.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system includes an optical assembly and a luminescent label. The luminescent label is attached to the optical assembly via a pressure sensitive adhesive. Furthermore, the luminescent label comprises at least a fluorophore layer configured to transform light received from a light source into output light that is projected by the optical assembly.

Also, according to one or more embodiments, an apparatus includes a fluorophore layer and a substrate layer. The fluorophore layer comprises fluorophore to transform light received from a light source into output light for an industrial application. The substrate layer is attached to the fluorophore layer. In an aspect, the substrate layer can be further attached to a pressure sensitive adhesive layer.

One or more embodiments also provide an apparatus that includes a pressure sensitive adhesive (PSA) layer and a fluorophore layer. The fluorophore layer is applied to the PSA layer. Furthermore, the fluorophore layer comprises fluorophore to transform light received from a light source into output light for an industrial application.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIGS. 7A-C illustrates exemplary optical systems.

DETAILED DESCRIPTION

Figure 1:
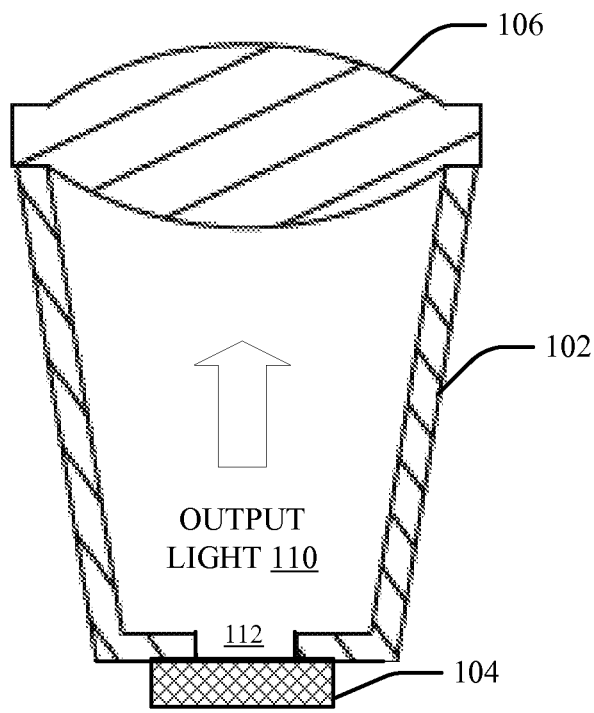
FIG. 1 is an overview of a system that employs a luminescent label.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers, etc. Likewise, the term "group" as utilized herein refers to a collection of one or more entities; e.g., a group of nodes refers to one or more nodes, etc.

Various aspects or features will be presented in terms of systems that may include a number of devices, components, modules, layers, and the like. It is to be understood and appreciated that the various systems may include additional devices, components, modules, layers etc. and/or may not include all of the devices, components, modules, layers, etc. discussed in connection with the figures. A combination of these approaches also can be used.

An optical sensor (e.g., industrial sensor, photoelectric sensor, proximity sensor, etc.) can generate a beam of light to, for example, detect distance, presence or absence of an object. Optical sensors typically contain a light-emitting diode (LED) or a laser diode behind a lens. Light emitted from the LED can then be projected through the lens to generate a beam of light employed to detect distance, presence or absence of an object. However, it is often difficult to align an optical beam associated with a conventional optical sensor (e.g., tolerances associated with conventional optical sensors are difficult to achieve). Furthermore, a light source associated with a conventional optical sensor can only be employed for a single purpose (e.g., to generate a beam of light).

To address these and other issues, one or more embodiments of the present disclosure providing an auxiliary light source in an optical assembly (e.g., an optical assembly associated with an optical sensor) and/or an industrial automation indicator. The auxiliary light source can facilitate improved alignment and/or tolerances associated with optical sensors (e.g., tolerance stack up can be reduced to provide closer alignment between an optical beam and a physical package of an optical sensor). Furthermore, the auxiliary light source can be less dependent on mechanical stack-up tolerances of existing optical sensors, optical beam wander can be reduced, LED location tolerances with respect to an optical system can be improved, a uniform and/or controlled illumination on a target can be generated, etc. The auxiliary light source can also provide flexibility for use in multiple industrial applications (e.g., industrial automation applications, industrial lighting applications, industrial instrumentation applications, etc.).

In an aspect, fluorophore can be applied to a substrate (e.g., a clear substrate, a transparent substrate, a translucent substrate, etc.) to form an auxiliary light source (e.g., a luminescent label comprising fluorophore). In one example, the substrate can be a rigid substrate. In another example, the substrate can be a flexible substrate. The auxiliary light source (e.g., fluorophore of luminescent label) can be energized in response to a light source (e.g., light emitted by an LED) to provide another light source for sourcing associated with an optical sensor (e.g., for detecting distance, presence or absence of an object, etc.). Additionally, auxiliary light source (e.g., fluorophore of luminescent label) can be energized in response to a light source (e.g., light emitted by an LED) to provide another light source for indication purposes (e.g., light indicators, instrumentation, signage, indication of certain operating parameters, etc.) associated with industrial equipment (e.g., industrial automation equipment).

FIG. 1 illustrates an example system 100 for employing an auxiliary light source associated with an optical assembly. System 100 includes an optical assembly 102 (e.g., optical component 102, optical unit 102, optical device 102, etc.) and a luminescent label 104 (e.g., a fluorescent label 104, a fluorophore label 104, etc.). The optical assembly 102 can support a lens 106. The lens 106 can be associated with one or more lenses for projecting light from the optical assembly 102. In one example, the optical assembly 102 and the lens 106 can be associated with an optical sensor (e.g., a photoelectric sensor, a proximity sensor, an industrial sensor, etc.). The luminescent label 104 can include at least fluorophore (e.g., one or more fluorophores). The fluorophore of the luminescent label 104 can be applied to (e.g., printed onto, attached to, embedded within, etc.) a substrate of the luminescent label 104. For example, the luminescent label 104 can comprise fluorophore printed onto a substrate. The substrate of the luminescent label 104 can be a rigid substrate to support the fluorophore. Alternatively, the substrate of the luminescent label 104 can be a flexible substrate to support the fluorophore. The substrate of the luminescent label 104 can be a clear substrate or a translucent substrate (e.g., the fluorophore can be printed onto a transparent or translucent substrate of the luminescent label 104). Alternatively, the fluorophore can be printed directly onto a pressure sensitive adhesive of the luminescent label 104. Fluorophore inks can be printed onto the luminescent label 104 via one or more printing processes and/or one or more deposition processes. The luminescent label 104 (e.g., the substrate of the luminescent label 104) can be round, a square, a rectangular, or another type of geometry.

The luminescent label 104 can be attached to the optical assembly 102. For example, the luminescent label 104 can be attached to an outer optical shroud of the optical assembly 102. Alternatively, the luminescent label 104 can be attached to an inner optical shroud of the optical assembly 102. In one implementation, the luminescent label 104 can be attached to the optical assembly 102 (e.g., an optical shroud of the optical assembly) via a mechanical technique. For example, the substrate of the luminescent label 104 that includes the fluorophore can be mechanically attached to the optical assembly. Additionally or alternatively, the luminescent label 104 can be attached to the optical assembly 102 via a pressure sensitive adhesive. The fluorophore can be applied, for example, to a first side of the substrate and a pressure sensitive adhesive can be applied, for example, to a second side of the substrate. Therefore, the substrate of the luminescent label 104 that includes the fluorophore can be attached (e.g., bonded, joined, etc.) to the optical assembly via the pressure sensitive adhesive. In yet another implementation, the luminescent label 104 can be attached to the optical assembly 102 during an injection molding process associated with the optical assembly 102. In an implementation where the luminescent label 104 does not include a substrate, a pressure sensitive adhesive of the luminescent label 104 that includes the fluorophore can be applied directly to the optics assembly 102.

In an implementation, the luminescent label 104 can be associated with an aperture 112 of the optical assembly 102 (e.g., the luminescent label 104 can cover an aperture of the optical assembly 102). The aperture 112 of the optical assembly 102 can be a round aperture, a square aperture, a rectangular aperture, or an aperture with a different geometry. Accordingly, the luminescent label 104 can be attached to an aperture plane of the optical assembly 102. However, it is to be appreciated that the luminescent label 104 can alternatively be attached to a natural focal plane of the optical assembly 102.

The luminescent label 104 can generate output light 110 in response to light 108 received from a light source (e.g., fluorophore of the luminescent label 104 can be illuminated in response to the light 108 received from the light source). For example, the fluorophore of the luminescent label 104 can be a fluorophore chemical compound that can emit light (e.g., the output light 110) in response to the light 108 received from the light source. The luminescent label 104 can emit the output light 110 at a specific wavelength. A wavelength associated with the output light 110 can be different than a wavelength associated with the light 108. For example, the fluorophore of the luminescent label 104 can absorb the light 108 associated with a particular wavelength (e.g., a particular color) and can re-emit the light 108 as the light 110 associated with a longer wavelength (e.g., a different color). The light source (e.g., an excitation light source for the luminescent label 104) that generates the light 108 can be a light-emitting diode (LED). For example, the light source can be, but is not limited to, a blue LED excitation source, an ultraviolet (UV) LED excitation source, a white LED excitation source, another type of LED excitation source, etc. Alternatively, the light source can be a laser (e.g., a laser diode), a phosphor emitter light source (e.g., a remote phosphor emitter light source), a solid state light source (e.g., a solid state electrical to optical light source), or another type of light source. In an implementation, the optical assembly 102, the luminescent label 104, and the light source that generates the light 108 can be associated with (e.g., located in) a common component (e.g., an optical sensor). The light source that generates the light 108 can be located behind the luminescent label 104. Alternatively, the light source that generates the light 108 can be located underneath the luminescent label 104. Alternatively, the light source that generates the light 108 can be in a different location to cause the fluorophore to fluoresce (e.g., the light 108 can be received from an alternate side of the luminescent label 104 associated with the lens 106 and can be projected back through the lens 106 as the output light 110, etc.). In another implementation, the light source can be a remote light source. For example, the optical assembly 102 and the luminescent label 104 can be associated with a particular component (e.g., an optical sensor), and the light source can be implemented separate from the particular component (e.g., the optical sensor).

Illumination of the luminescent label 104 by the light 108 (e.g., light 108 generated by the light source) can result in fluorophore of the luminescent label 104 fluorescing into a particular color or set of colors (e.g., fluorophore of the luminescent label 104 generating the output light 110 that is associated with a particular color or set of colors). Color associated with the output light 110 can be different than color associated with the light 108. For example, the light 108 can be associated with a first color and the output light 110 can be associated with at least a second color (e.g., the luminescent label 104 can transform a color associated with the light 108). Furthermore, fluorophore of the luminescent label 104 can allow the output light 110 (e.g., a light beam of the output light 110) to be more uniform (e.g., better directed) than the light 108. Uniformity of the output light 110 (e.g., light emission of the luminescent label 104) can be controlled by the deposition process and/or the printing process employed to apply the fluorophore to the substrate.

In response to the output light 110 being generated by the luminescent label 104 (e.g., light emission of the luminescent label 104), the lens 106 can project the output light 110. Optical shroud of the optical assembly 102 can maintain the output light 110 within the optical assembly 102 so that the lens 106 can project the output light 110. In one example, the lens 106 can be implemented as an emitter lens of an optical sensor (e.g., a photoelectric sensor, a proximity sensor, an industrial sensor, etc.). An optical sensor can comprise, for example, at least the optical assembly 102 and the lens 106. Therefore, in an aspect, the output light 110 generated by the luminescent label 104 and projected by the lens 106 can be output light of an optical sensor. In one example, the output light 110 project by the lens 106 can be projected as a stationary beam of light. Alternatively, the output light 110 project by the lens 106 can be projected in an oscillatory manner to sweep across a viewing area to be monitored by an optical sensor. The output light 110 project by the lens 106 can be a pulsed beam of light (e.g., a modulated beam of light) or a beam of light that is not pulsed (e.g., not modulated).

In an implementation, the optical assembly 102 (e.g., the optical assembly and the lens 106) can be associated with a two-dimensional (2D) imaging sensor. A 2D imaging sensor that comprises at least the optical assembly 102 can be used, for example, to detect and identify shape and/or surface characteristics of objects within a viewing field. In another implementation, the optical assembly 102 can be associated with a three-dimensional (3D) imaging sensor (e.g., time-of-flight (TOF) sensor). A 3D imaging sensor that comprises at least the optical assembly 102 can be used, for example, to determine distance information and/or 2D shape information for objects and surfaces within a viewing field. The lens 106 can project the output light 110 toward a viewing area to be monitored. Accordingly, the output light 110 generated by the luminescent label 104 can be emitted from the lens 106 (e.g., an emitter lens) to facilitate detecting distance, presence and/or absence of an object within a viewing field.

In an aspect, the output light 110 generated by the luminescent label 104 can comprise a code (e.g., a color code). For example, ratios of wavelengths associated with the output light 110 generated by the luminescent label 104 can form a code. Therefore, the output light 110 generated by the luminescent label 104 can be associated with a ratio of emission wavelengths. The code associated with the output light 110 can be a unique code (e.g., a unique color code) determined by the fluorophore of the luminescent label 104. For example, a ratio associated with the output light 110 can be defined by a fluorophore composition (e.g., a fluorophore dopant composition) of the luminescent label 104 (e.g., a fluorophore composition determined by printing fluorophore on the substrate). In one implementation, fluorophore of the luminescent label 104 can be configured to emit timing signals (e.g., slewed timing signals) based on a light source that generates the light 108. The code associated with the output light 110 generated by the luminescent label 104 can reduce noise associated with other sensors and/or other devices (e.g., parasitic talk and/or cross talk from other sensors in an environment). The code associated with the output light 110 can include, but is not limited to, an authentication code (e.g., a product authentication code), a date code, a location code (e.g., a manufacturing location code), a wavelength bar code, a time of flight (ToF) code, another type of code, etc.

The luminescent label 104 can provide a way to generate any light color and/or wavelength that can be used as an excitation source for the optical assembly 102 (e.g., an optical sensor). The luminescent label 104 also provides a way to standardize a set of LED types in inventory while allowing for greater functionality of an optical sensor. For example, rather than maintaining a large quantity of LEDs in inventory and/or changing LEDs of an optical sensor to attain certain design criteria, a single LED can be employed by an optical sensor and/or different design criteria can be attained by changing design of a luminescent label 104. This consolidation in part inventory (e.g., LED inventory) can provide reduction in purchases and/or costs. Furthermore, the luminescent label 104 can provide improved detection of distance, presence or absence of an object and/or improved color sensing.

Figure 2:
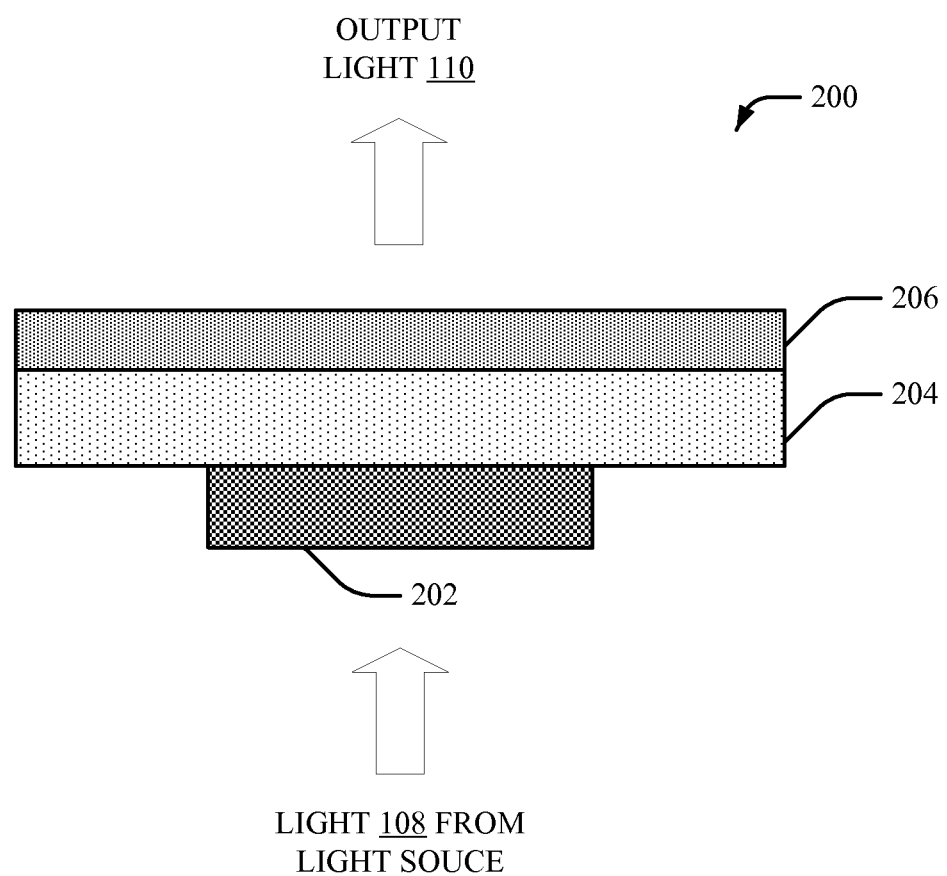
FIG. 2 illustrates a side-view of an exemplary luminescent label.

FIG. 2 illustrates an example luminescent label 200 (e.g., a side-view of an example luminescent label 200). The luminescent label 200 can be associated with an industrial application (e.g., an optical sensor, industrial equipment, industrial automation equipment, industrial indicators, industrial instrumentation, etc.). In one example, the luminescent label 200 can correspond to the luminescent label 104 shown in FIG. 1. However, it is to be appreciated that the luminescent label 200 can be implemented separate from the system 100 (e.g., for indication purposes associated with industrial automation equipment, etc.). In the embodiment shown in FIG. 2, the luminescent label 200 includes a fluorophore layer 202 (e.g., a fluorophore-based layer 202), a substrate layer 204 and a pressure sensitive adhesive (PSA) layer 206. However, it is to be appreciated that the luminescent label 200 can be implemented without the PSA layer 206. The fluorophore layer 202 can be applied to the substrate layer 204. For example, the fluorophore layer 202 can be printed onto the substrate layer 204 via one or more printing processes and/or one or more deposition processes. The fluorophore layer 202 can cover at least a portion of a surface of the substrate layer 204. For example, the fluorophore layer 202 can cover a portion of a surface of the substrate layer 204 and another portion of the surface of the substrate layer 204 can be uncovered. In another example, the fluorophore layer 202 can cover an entire surface of the substrate layer. A first surface of the substrate layer 204 can be associated with the fluorophore layer 202 and a second surface of the substrate layer 204 can be associated with the PSA layer 206. Alternatively, the fluorophore layer 202 can be applied directly onto the PSA layer 206. For example, the luminescent label 200 can be implemented without the substrate layer 204. In another example, the fluorophore layer 202 can be applied to a first surface of the PSA layer 206 and a second surface of the PSA layer 206 can be applied to the substrate 204.

The fluorophore layer 202 can comprise fluorophore (e.g., fluorophore chemical compound(s)). The fluorophore layer 202 can receive the light 108 (e.g., the light 108 generated by a light source) and can transform the light into the output light 110. For example, the fluorophore layer 202 can comprise one or more types of fluorophore that can emit the output light 110 in response to the light 108. The output light 110 can comprise a different wavelength than the light 108. In certain implementations, the substrate 204 and/or the PSA layer 206 can alternatively receive the light 108 and the fluorophore layer 202 can transmit the output light 110 from a surface of the fluorophore layer 202 that is not associated with the substrate 204 and/or the PSA layer 206. For example, the luminescent label 200 can alternatively be oriented so the light 108 passes through the luminescent label 200 in an opposite direction to what is shown in FIG. 2. It is to be appreciated that composition and/or properties of the fluorophore associated with the fluorophore layer 202 (e.g., fluorophore dye composition and/or properties) can be varied to generate a particular type of output light 110. The substrate layer 204 can be a clear (e.g., transparent, etc.) substrate layer. Alternatively, the substrate layer 204 can be a translucent (e.g., hazy, etc.) substrate layer. Furthermore, the substrate layer 204 can be a rigid substrate layer. Alternatively, the substrate layer 204 can be a flexible substrate layer. The substrate layer 204 can comprise a clear material, such as but not limited to, clear acrylic, a transparent thermoplastic, a clear glass, another type of transparent material, etc. Alternatively, the substrate layer 204 can comprise a translucent material, such as but not limited to, translucent acrylic, a translucent thermoplastic, translucent glass, another type of translucent material, etc. The substrate layer 204 can provide stability for the fluorophore layer 202 (e.g., fluorophore printed on the substrate layer 204). The PSA layer 206 can be, for example, a flexible pressure sensitive adhesive layer.

In an implementation, the output light 110 generated by the fluorophore layer 202 (e.g., the luminescent label 104) can be received by the optical assembly 102 and projected by the lens 106. For example, the luminescent label 200 (e.g., luminescent label 104) can be attached to the optical assembly 102 (e.g., an aperture plane of the optical assembly 102). In one example, the PSA layer 206 (e.g., an outer surface of the PSA layer 206) can be adhered to the optical assembly 102. Additionally or alternatively, the substrate layer 204 can be mechanically affixed to the optical assembly 102. A width of the fluorophore layer 202, in one example, can correspond (e.g., approximately correspond) to a width of the aperture 112 of the optical assembly 102. In another example, a width of the fluorophore layer 202 can be smaller or larger than a width of the aperture 112 of the optical assembly 102. A width of the substrate layer 204 can be larger than a width of the aperture 112 of the optical assembly 102 so that the aperture 112 is covered (e.g., completely covered) by at least a portion of the luminescent label 200. For example, a width of the substrate layer 204 can correspond (e.g., approximately correspond) to a width of a base of the optical assembly 102. In an implementation, the output light 110 generated by the fluorophore layer 202 (e.g., the luminescent label 200) can alternatively be received by an indicator associated with industrial equipment (e.g., industrial automation equipment, industrial instrumentation, industrial lighting, industrial indicators, etc.). The luminescent label 200 can be employed, for example, as a light source for indicator lights and/or signage associated with industrial equipment.

Figure 3:
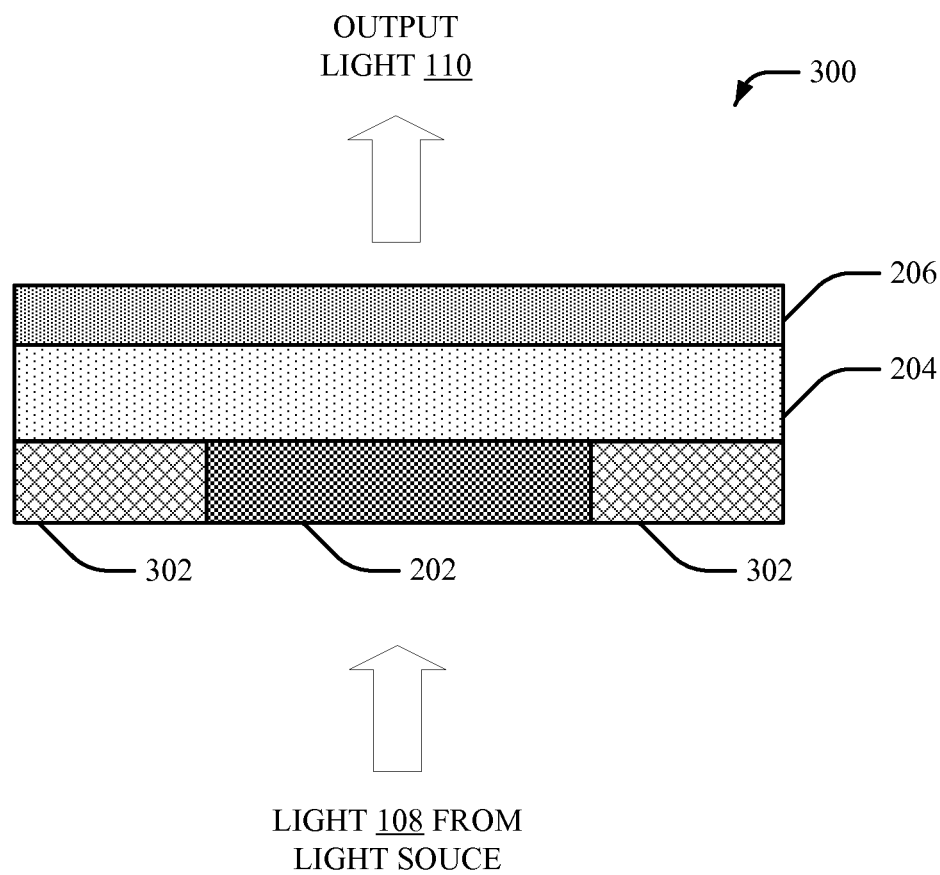
FIG. 3 illustrates a side-view of an exemplary luminescent label comprising a mask.

FIG. 3 illustrates an example luminescent label 300 (e.g., a side-view of an example luminescent label 300). The luminescent label 300 can be associated with an industrial application (e.g., an optical sensor, industrial equipment, industrial automation equipment, industrial indicators, industrial instrumentation, etc.). In one example, the luminescent label 300 can correspond to the luminescent label 104 shown in FIG. 1. However, it is to be appreciated that the luminescent label 300 can be implemented separate from the system 100 (e.g., for indication purposes associated with industrial automation equipment, etc.). In the embodiment shown in FIG. 3, the luminescent label 300 includes the fluorophore layer 202, the substrate layer 204 and/or the PSA layer 206. Additionally, the luminescent label 300 includes a mask layer 302 (e.g., an opaque layer 302). The fluorophore layer 202 and the mask layer 302 can be applied to the substrate layer 204. The mask layer 302 can be associated with one or more opaque printing inks that are applied to the substrate layer 204 (e.g., printed on the substrate layer 204) via one or more printing processes and/or one or more deposition processes. Alternatively, the fluorophore layer 202 can be applied directly to the pressure sensitive adhesive layer 206 and/or the luminescent label 300 can be implemented without the substrate layer 204.

The mask layer 302 can be applied to the substrate layer 204 in addition to the fluorophore layer 202 so that the light 108 is not emitted through the substrate layer 204 (e.g., so that only the output light 110 generated by the fluorophore layer 202 is emitted by the luminescent label 300, to block the light 108, etc.). For example, the mask layer 302 can be applied to the substrate layer 204 where the fluorophore layer 202 is not applied to the substrate layer 204 (e.g., in order to fully cover the aperture 112 of the optic assembly 102 with the fluorophore layer 202 and the mask layer 302). Alternatively, the fluorophore layer 202 can be applied to the mask layer 302 (e.g., printed on top of the mask layer 302 to cover at least a portion of the mask layer 302). Accordingly, only an area of the fluorophore layer 202 exposed to the lens 106 will be projected. In certain implementations, the luminescent label 300 can alternatively be oriented so the light 108 passes through the luminescent label 300 (and the output light 110 is projected in) an opposite direction to what is shown in FIG. 3.

In one example, the mask layer 302 can provide an opaque border for the fluorophore layer 202. In another example, the fluorophore layer 202 can be interposed between the mask layer 302 (e.g., a first portion of the mask layer 302 and a second portion of the mask layer 302). However, it is to be appreciated that the mask layer 302 can be applied to the substrate layer 204 based on design criteria of a particular implementation. By implementing the mask layer 302, noise associated with other light (e.g., cross talk associated with other sensors in an environment) can also be reduced.

Figure 4:
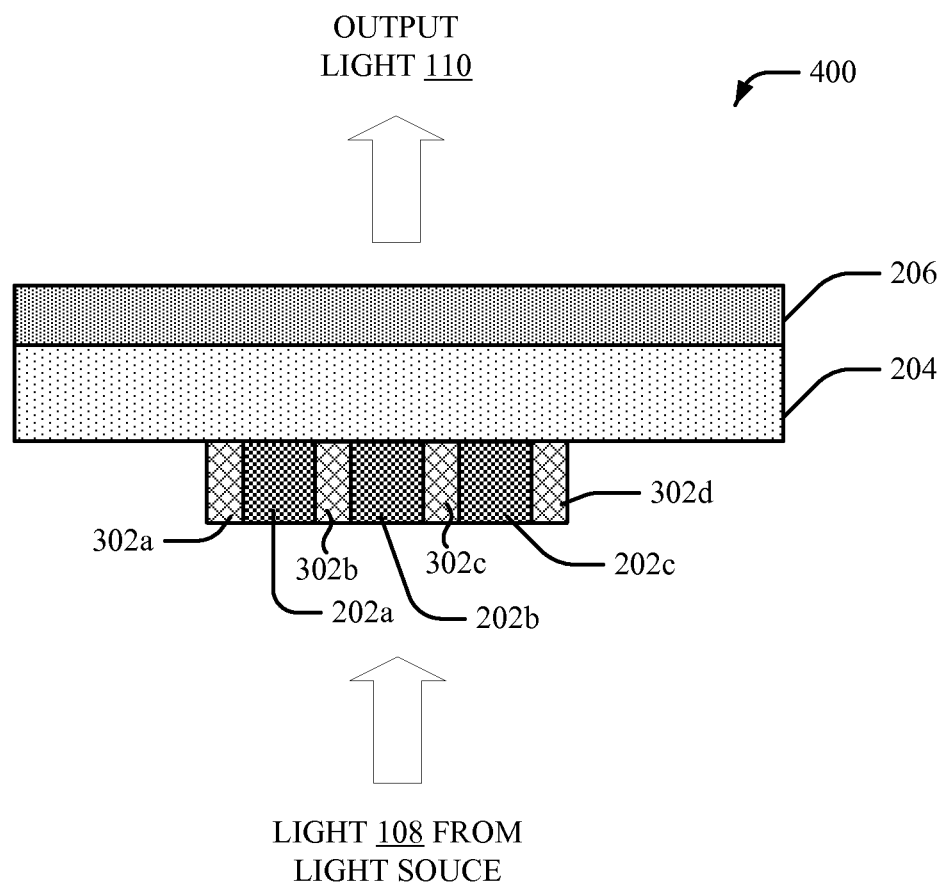
FIG. 4 illustrates a side-view of another exemplary luminescent label comprising a mask.

FIG. 4 illustrates an example luminescent label 400 (e.g., a side-view of an example luminescent label 400). The luminescent label 400 can be associated with an industrial application (e.g., an optical sensor, industrial equipment, industrial automation equipment, industrial indicators, industrial instrumentation, etc.). In one example, the luminescent label 400 can correspond to the luminescent label 104 shown in FIG. 1. However, it is to be appreciated that the luminescent label 400 can be implemented separate from the system 100 (e.g., for indication purposes associated with industrial automation equipment, etc.). In the embodiment shown in FIG. 4, the fluorophore layer 202 is implemented as a plurality of fluorophore layers 202a-c. Furthermore, the mask layer 302 is implemented as a plurality of mask layers 302a-d. Rather than generating uniform output light 110 as in FIG. 2 and FIG. 3, the plurality of fluorophore layers 202a-c generate striped output light 110. The plurality of mask layer 302a-d are implemented around the plurality of fluorophore layers 202a-c so that the light 108 is not emitted through the substrate layer 204. In an implementation, each of the plurality of fluorophore layers 202a-c can generate output light 110 associated with the same color. In another implementation, the plurality of fluorophore layers 202a-c can generate output light 110 associated with two or more colors. For example, the fluorophore layer 202a can generate output light 110 associated with a first color (e.g., the fluorophore layer 202a can be associated with a first fluorophore composition), the fluorophore layer 202b can generate output light 110 associated with a second color (e.g., the fluorophore layer 202b can be associated with a second fluorophore composition), etc. Alternatively, the fluorophore layer 202 can be applied to the mask layer 302 (e.g., printed on top of the mask layer 302 to cover at least a portion of the mask layer 302). Accordingly, only an area of the fluorophore layer 202 exposed to the lens 106 will be projected. In certain implementations, the luminescent label 400 can alternatively be oriented so the light 108 passes through the luminescent label 400 (and the output light 110 is projected) in an opposite direction to what is shown in FIG. 4.

Figure 5:
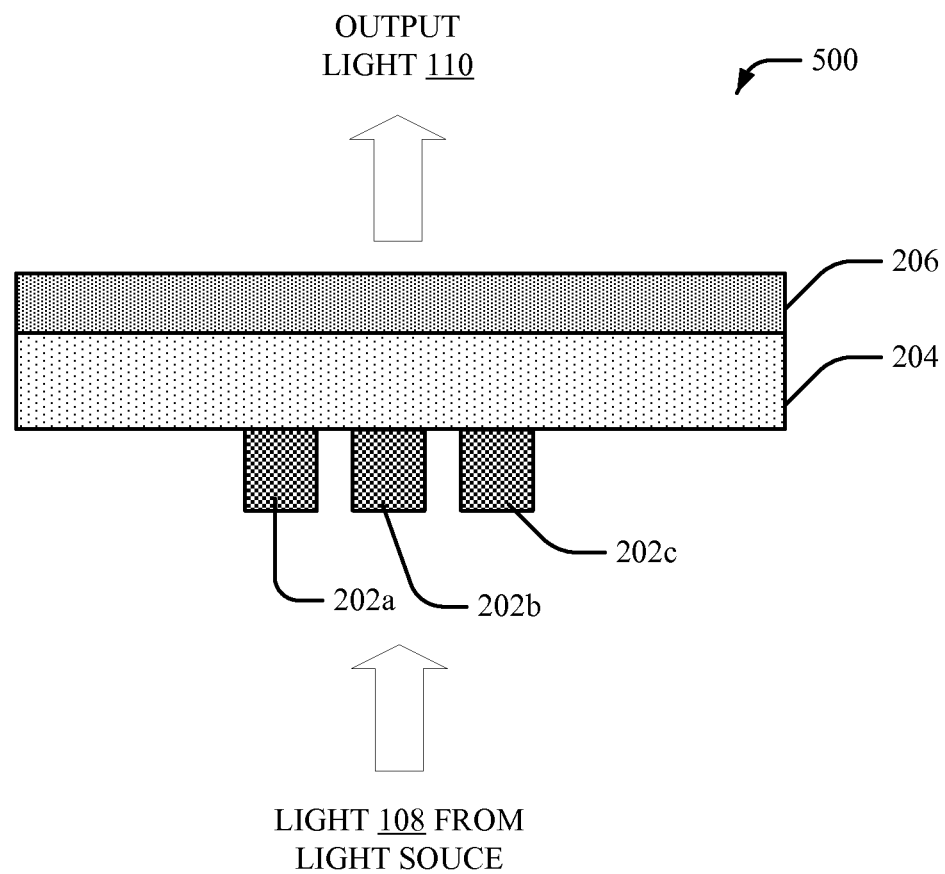
FIG. 5 illustrates a side-view of another exemplary luminescent label.

FIG. 5 illustrates an example luminescent label 500 (e.g., a side-view of an example luminescent label 104). The luminescent label 500 can be associated with an industrial application (e.g., an optical sensor, industrial equipment, industrial automation equipment, industrial indicators, industrial instrumentation, etc.). In one example, the luminescent label 500 can correspond to the luminescent label 104 shown in FIG. 1. However, it is to be appreciated that the luminescent label 500 can be implemented separate from the system 100 (e.g., for indication purposes associated with industrial automation equipment, etc.). In the embodiment shown in FIG. 5, the fluorophore layer 202 is implemented as a plurality of fluorophore layers 202a-c without the mask layer 302 (e.g., without the plurality of mask layers 302a-d). As in FIG. 4, the plurality of fluorophore layers 202a-c generate a striped output light 110. Furthermore, since the plurality of mask layer 302a-d are not implemented around the plurality of fluorophore layers 202a-c, light 108 generated by the light source is also emitted through the substrate layer 204 in addition to the striped output light 110 generated by the plurality of fluorophore layers 202a-c. The light 108 emitted through the substrate layer 204 can be striped light. Furthermore, the light 108 emitted through the substrate layer 204 (e.g., striped light) can be associated with a different color than the striped output light 110 generated by the plurality of fluorophore layers 202a-c. The luminescent label 400 and/or the luminescent label 500 (e.g., luminescent label 104) shown in FIG. 4 and FIG. 5 can be employed, for example, to generate a code (e.g., a color code). For example, ratios of wavelengths associated with the output light 110 generated by the luminescent label 400 and/or the luminescent label 500 (e.g., luminescent label 104) and/or the light 108 emitted through the substrate layer 204 can form a code. It is to be appreciated that the fluorophore layer 202 (e.g., the fluorophore layers 202a-c) can be associated with a uniform distribution of fluorophore patterns, varying fluorophore patterns, varying fluorophore shapes, varying emission wavelengths and/or varying temporal outputs. Alternatively, the fluorophore layer 202 can be applied to the mask layer 302 (e.g., printed on top of the mask layer 302 to cover at least a portion of the mask layer 302). Accordingly, only an area of the fluorophore layer 202 exposed to the lens 106 will be projected. In certain implementations, the luminescent label 500 can alternatively be oriented so the light 108 passes through the luminescent label 500 (and the output light 110 is projected) in an opposite direction to what is shown in FIG. 5.

Figure 6A:
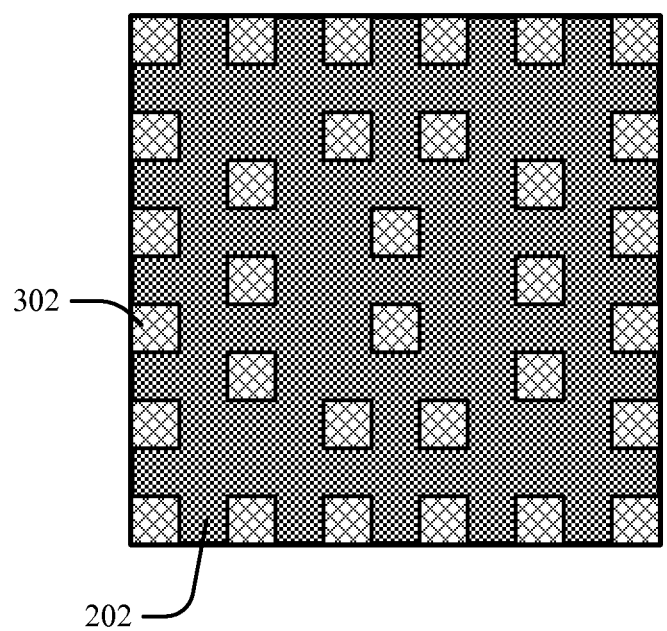
FIG. 6A-B illustrate a bottom-view of an exemplary masked fluorophore layer of a luminescent label.

FIG. 6A illustrates an example masked fluorophore layer of a luminescent label (a bottom-view of an exemplary masked fluorophore layer of a luminescent label). In the embodiment shown in FIG. 6A, a mask pattern corresponding to the mask layer 302 is applied to the fluorophore layer 202 (e.g., fluorophore layer 202 that is applied to the substrate layer 204). The mask pattern corresponding to the mask layer 302 can be employed to vary density (e.g., intensity) of the output light 110 generated by the fluorophore layer 202. Therefore, the mask layer 302 can additionally or alternatively be applied to the fluorophore layer 202 (e.g., in addition to or rather than being applied to the substrate layer 204). It is to be appreciated that the mask pattern of the mask layer 302 shown in FIG. 6A is merely an example. Therefore, a mask pattern of the mask layer 302 can be varied based on design criteria of a particular implementation.

Figure 6B:
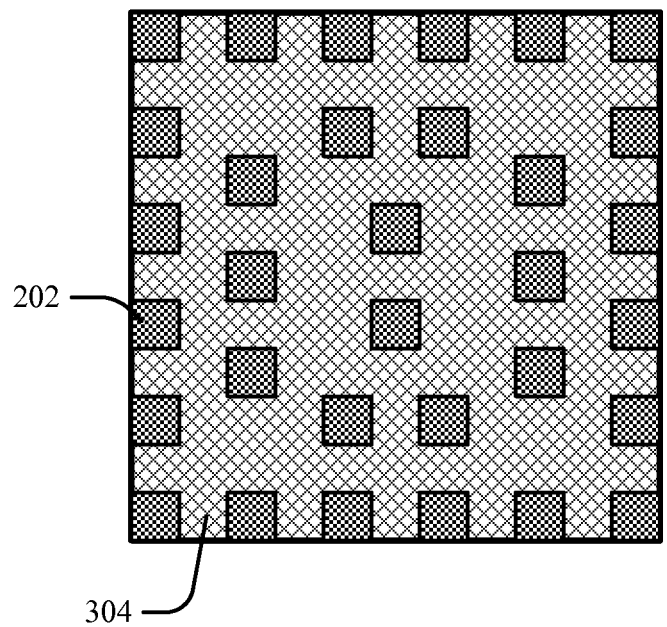

FIG. 6B illustrates another example masked fluorophore layer of a luminescent label (a bottom-view of an exemplary masked fluorophore layer of a luminescent label). In the embodiment shown in FIG. 6B, a fluorophore pattern corresponding to the fluorophore layer 202 is generated (e.g., applied to the substrate layer 204). Furthermore, a mask layer 304 is applied (e.g., to the substrate layer 204) around the fluorophore layer 202. Accordingly, the fluorophore layer 202 can be configured in a certain pattern and spaces around the fluorophore layer 202 can be filled with the mask layer 304 to block light (e.g., the light 108). It is to be appreciated that the fluorophore pattern of the fluorophore layer 202 shown in FIG. 6B is merely an example. Therefore, a fluorophore pattern of the fluorophore layer 202 can be varied based on design criteria of a particular implementation.

FIGS. 7A-C illustrate example optical systems (e.g., example light output projected by a lens of an optical assembly). FIG. 7A illustrates an example optical assembly without a luminescent label 104 (e.g., a conventional optical system). For example, an optical assembly 702 that supports a lens 704 can receive light from a light source 706. The light source 706 can be an LED, a laser (e.g., a laser diode), a phosphor emitter light source (e.g., a remote phosphor emitter light source), a solid state light source (e.g., a solid state electrical to optical light source), a blue/UV light source, and/or another type of light source. The light provided by the light source 706 can be projected by the lens 704 to a target plane 708. The target plane 708 can comprise a pattern of light 710 projected by the lens 704. As shown in FIG. 7A (e.g., conventional optical systems), an aperture (e.g., the pattern of light 710) projected though the optical assembly 702 onto the target plane 708 at a certain distance has a natural tendency to fall off as a function of distance from the center of the projected aperture.

FIG. 7A and FIG. 7B illustrate the optical assembly 102 employing a luminescent label 104, as more fully disclosed herein. As shown in FIG. 7A and FIG. 7B, the luminescent label 104 is attached to the optical assembly 102. The luminescent label 104 can receive the light 108 generated by the light source 706 (e.g., a light source that generates the light 108). The luminescent light 104 can also generate the output light 110 that is projected by the lens 106 of the optical assembly 102. Therefore, an improved pattern of light can be generated without loss of efficiency of light/wavelength. Furthermore, as shown in FIG. 7B, an aperture (e.g., a pattern of light 712) projected though the optical assembly 102 onto the target plane 708 at a certain distance does not fall off as a function of distance from the center of the projected aperture. In other words, more light is generated on the edges of an aperture (e.g., the pattern of light 712) projected though the optical assembly 102 as compared to conventional optical systems (e.g., the pattern of light 710). Accordingly, the projected image of the aperture (e.g., the pattern of light 712) projected though the optical assembly 102 is better controlled and/or comprises improved uniformity (e.g., controlled uniformity) that allows sensors to be more easily aligned. Additionally, color and/or wavelength associated with the light 108 generated by the light source 706 can be different than color and/or wavelength associated with the output light 110 generated by the luminescent label 104 (e.g., the fluorophore layer 202 of the luminescent label 104). As shown in FIG. 7C, close arrangement of discrete sources can be provided (e.g., without the penalty of wiring different sources onto a printed circuit board surface). The discrete light sources shown in FIG. 7C can be employed, for example, to sense distance (e.g., structured light) and/or can be employed in Time of Flight applications. In one example, the pattern of light 712 shown in FIG. 7B can be generated by employing the luminescent label 200 shown in FIG. 2 or the luminescent label 300 shown in FIG. 3. In another example, the pattern of light 714 shown in FIG. 7C can be generated by employing the luminescent label 400 shown in FIG. 4.

As shown at least in FIG. 7B and FIG. 7C, the luminescent label 104 coupled to the optical assembly 102 can provide generation of a light source which compensates the natural off-axis in wide-angle optical sensors, generation of a patterned or multiple image points on a target with a single light illumination source and limited space in an optical sensor, generation of a controlled color spectrum for color contrast or full color sensing, generation of a ratio color spectrum to provide unique source signals for elimination of cross-talk between equal color sensors, generation of a variety of indications colors and patterns using a single light source, generation of a variety of indication colors and patterns using a single light source that is viewable from a multitude of viewing angles and/or sensor orientations, ability to rapidly modify indication signage as required by market needs, ability of isolating intended light from unintended light through use of opaque borders (e.g., mask layers) printed in close proximity or on top of printed fluorophore layers, and/or other improvements to conventional optical systems.

Figure 8:
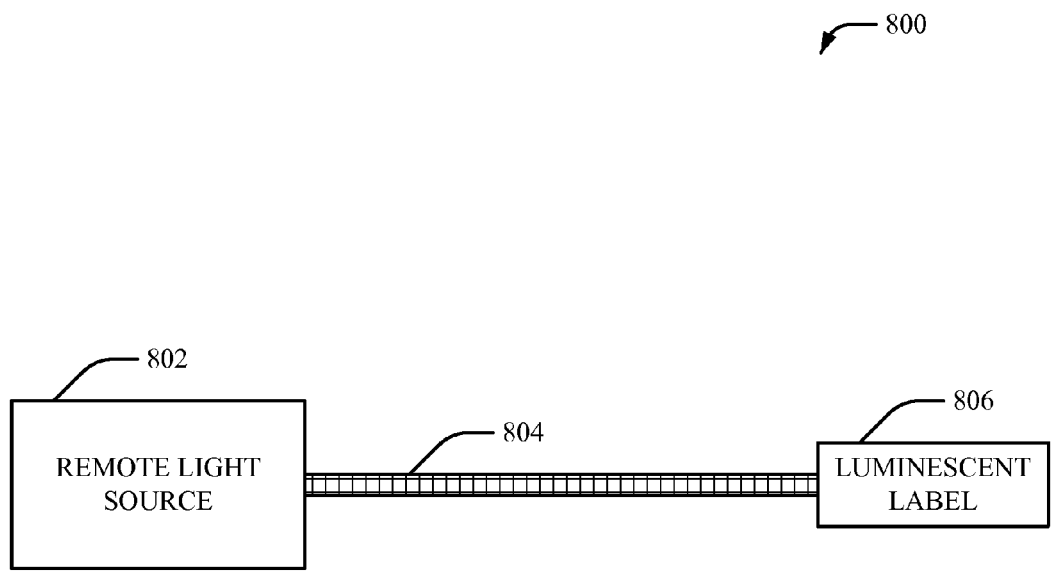
FIG. 8 is an overview of a system that employs a remote light source.

FIG. 8 illustrates an example system 800 for employing a remote light source. System 800 can include a remote light source 802, a light guide 804 and a luminescent label 806. In one example, the remote light source 802 can generate the light 108. The remote light source 802 can comprise an LED. Alternatively, the remote light source 802 can comprise a laser or a phosphor emitter light source. In one example, the light source 802 can be associated with an integration box (e.g., a hollow box that includes metallic walls or white walls). The light guide 804 can be a light conveyance guide to transmit light from the remote light source 802 to the luminescent label 806. In one example, the light guide 804 can be an optical fiber. In another example, the light guide 804 can be a light pipe. The light guide 804 can be over-molded without loss of conveyance properties (e.g., unlike conventional light guides). For example, the light guide 804 can be a bendable light guide configured based on design criteria of a particular implementation. The remote light source 802 and the light guide 804 can configured, for example, as a light engine. The luminescent label 806 can be placed according to design criteria of a particular implementation and/or to provide maximum visual support without the need to locate the luminescent label 806 close to a printed circuit board employing a required single color LED.

In an alternate embodiment, light guide features can be incorporated into a pressure sensitive adhesive layer (e.g., the PSA layer 206) or into part of the label construction for a luminescent label. For example, the PSA layer 206 can be configured as a light guide with extraction features to transmit LED light coming from one side of a luminescent label through liquid-crystal display (LCD) pixels. Furthermore, if a light engine is employed, then a modification to signage information, wavelength emitted, and distribution of color and/or information can be modified by changing a design of a luminescent label. In contrast, existing techniques require an entire new light guide shape (e.g., for any information or shape change) and/or different LEDs (e.g., for a color change) to modify signage information, wavelength emitted, and distribution of color and/or information.

In an example, a portion of light (e.g., light 108) generated by the remote light source 802 can enter the light guide 804 and can reach the luminescent label 806. Moreover, another portion of the light (e.g., light 108) generated by the remote light source 802 can bounce about an integration box structure of the remote light source 802 before eventually entering the light guide 804. Therefore, the other portion of the light generated by the remote light source 802 (e.g., light that does not initially enter the light guide 804) can be reused or captured rather than being wasted energy. For example, the remote light source 802 can provide recapture of light (e.g., light emitted by an LED of the remote light source 802) that would normally escape from an optical system.

Figure 9:
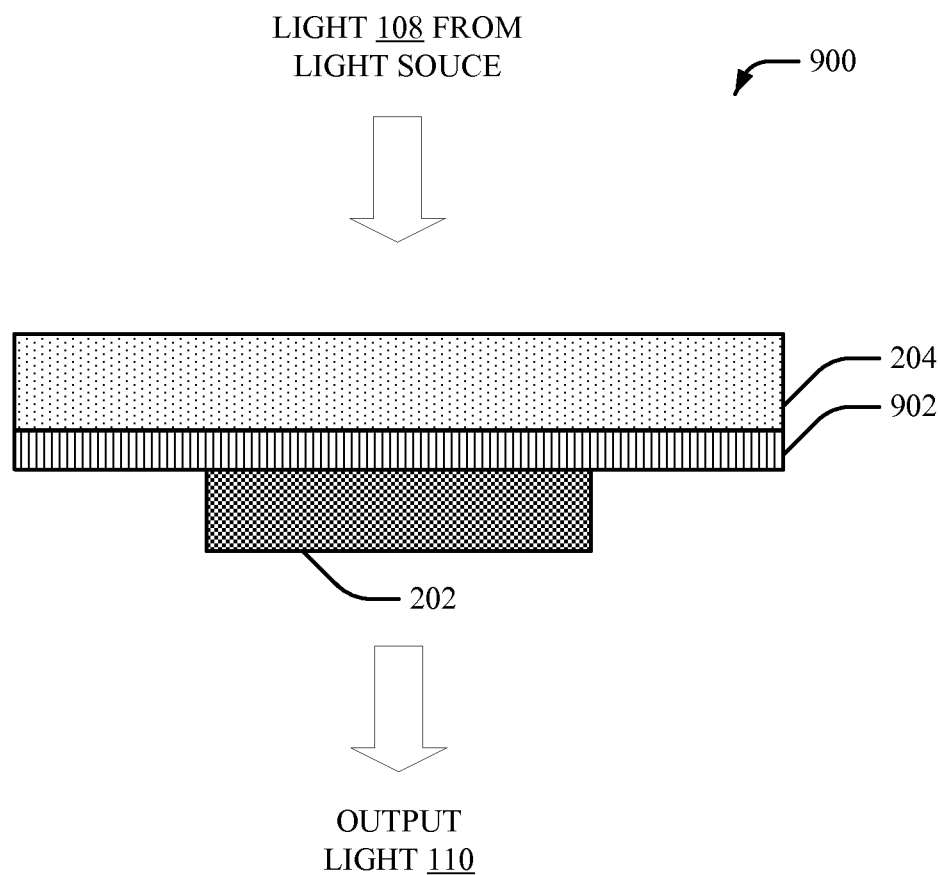
FIG. 9 illustrates a side-view of yet another exemplary luminescent label.

FIG. 9 illustrates an example luminescent label 900. The luminescent label 900 can be associated with an industrial application (e.g., an optical sensor, industrial equipment, industrial automation equipment, industrial indicators, industrial instrumentation, etc.). In one example, the luminescent label 900 can correspond to the luminescent label 104 shown in FIG. 1. However, it is to be appreciated that the luminescent label 900 can be implemented separate from the system 100 (e.g., for indication purposes associated with industrial automation equipment, etc.). In the embodiment shown in FIG. 9, the luminescent label 900 includes at least the fluorophore layer 202, the substrate layer 204 and a metal layer 902 (e.g., a hot mirror layer 902). Additionally, the luminescent label 900 can include the PSA layer 206 and/or the mask layer 302. The substrate layer 204 and/or the metal layer 902 can receive the light 108 before the fluorophore layer 202. For example, the fluorophore layer 202 can be located in an optics path on a side of the metal layer 902 that is opposite to a light source that generates the light 108. The fluorophore layer 202 can be printed on a clear surface or a translucent surface of the luminescent label 900. In an implementation, fluorophore of the fluorophore layer 202 can be printed on the metal layer 902 (e.g., a proper side of the metal layer 902). Alternatively, fluorophore of the fluorophore layer 202 can be printed on the substrate layer 204. Alternatively, fluorophore of the fluorophore layer 202 can be printed on the PSA layer 206. The metal layer 902 can be a layer of metal that allows light generated by the fluorophore layer 202 to penetrate through, but reflects light off a reflective surface in contact with the substrate layer 204. For example, the metal layer 902 can allow the output light 110 associated with the fluorophore layer 202 to pass through with minimal attenuation. The metal layer 902 can additionally act as a mirror for longer wavelengths, and thus the output light 110 associated with the fluorophore layer 202 can be reflected into a desired direction. Therefore, intensity of the output light 110 projected by the luminescent label 900 (e.g., the fluorophore layer 202) can be increased and/or efficiency of the luminescent label 900 can be increased.

Figure 10:
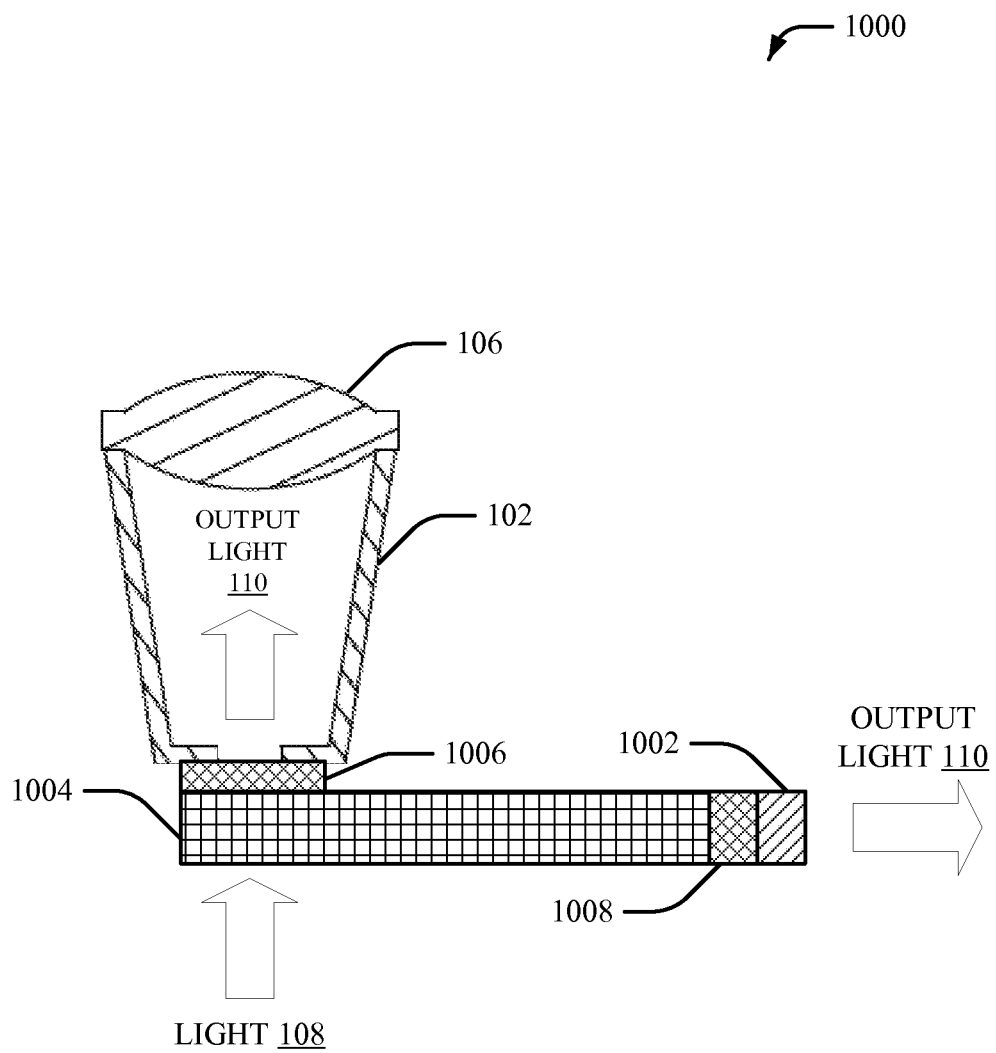
FIG. 10 is an overview of a system that employs a single light source for multiple luminescent labels.

FIG. 10 illustrates an example system 1000 for employing a single light source for multiple luminescent labels (e.g., multiple luminescent label applications). The system 1000 provides the ability to use light from an excitation source to, for example, drive both an optical sensor source and indicator output. For example, a light source that generates the light 108 (e.g., the remote light source 802) can be employed for the optical assembly 102 and an indicator 1002. In the embodiment shown in FIG. 10, the light source that generates the light 108 (e.g., the remote light source 802) can enter a light guide 1004 (e.g., an injected molding light guide) from a back side of the light guide 1004 opposite to the optical assembly 102. A portion of the light 108 (e.g., most of the light 108) can pass through the light guide 1004 and can reach (e.g., directly strike) a luminescent label 1006 of the optical assembly 102 (e.g., to become a light source for an optical sensor). Additionally, another portion of the light 108 can be transmitted (e.g., directed) via the light guide 1004 to another luminescent label 1008 associated with the indicator 1002 (e.g., to emit the other portion of the light 108 an indicator). Accordingly, energy associated with the light 108 (e.g., the light 108 generated by a single light source) can be reused and/or employed by multiple luminescent label applications. It is to be appreciated that system 1000 is merely an example. Therefore, a single light source can be employed for other purposes associated with multiple luminescent labels.

Figure 11:
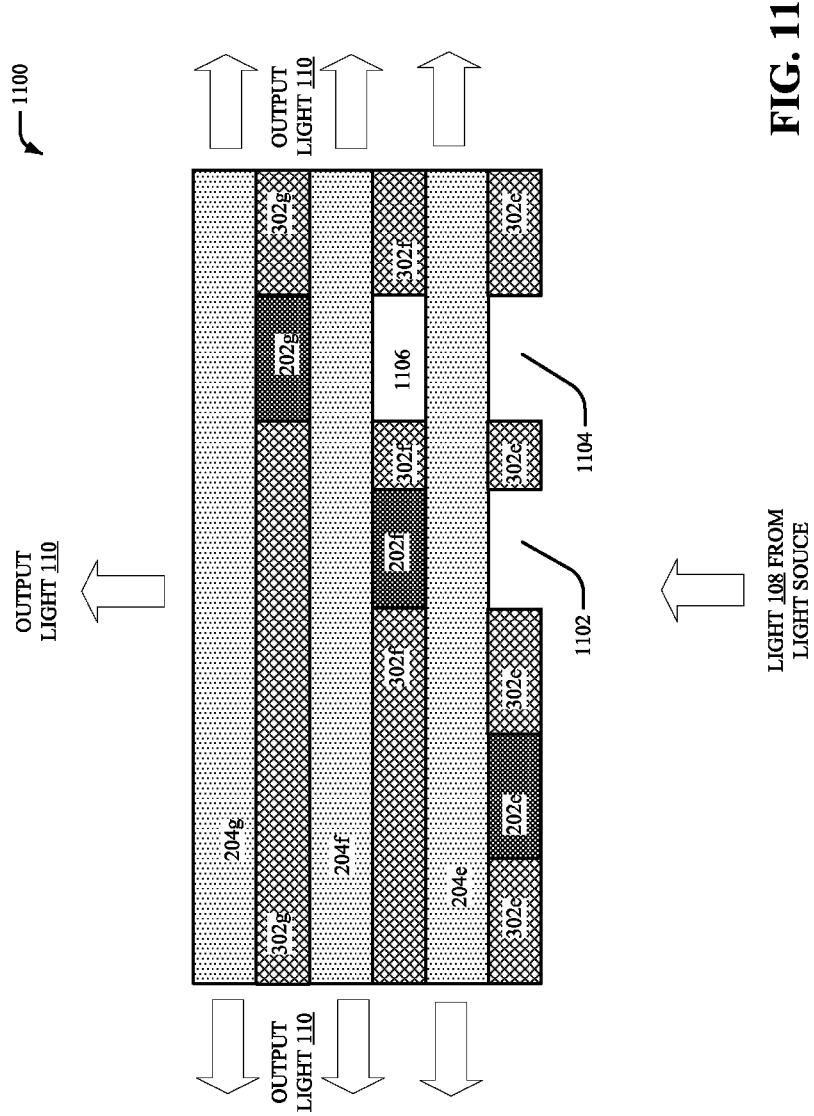
FIG. 11 illustrates a side-view of an exemplary luminescent label with multiple fluorophore layers.

FIG. 11 illustrates an example luminescent label 1100 that comprises multiple fluorophore layers. The luminescent label 1100 can be associated with an industrial application (e.g., an optical sensor, industrial equipment, industrial automation equipment, industrial indicators, industrial instrumentation, etc.). In one example, the luminescent label 1100 can correspond to the luminescent label 104 shown in FIG. 1. However, it is to be appreciated that the luminescent label 1100 can be implemented separate from the system 100 (e.g., for indication purposes associated with industrial automation equipment, etc.). In the embodiment shown in FIG. 11, the luminescent label 1100 (e.g., a multi-layer luminescent label) includes a first fluorophore layer 202e, a second fluorophore layer 202f and a third fluorophore layer 202g (e.g., an array of fluorophore layers). The first fluorophore layer 202e can be associated with a first mask layer 302e and a first substrate layer 204e, the second fluorophore layer 202f can be associated with a second mask layer 302f and a second substrate layer 204f, and the third fluorophore layer 202g can be associated with a third mask layer 302g and a third substrate layer 204g. However, it is to be appreciated that the luminescent label 1100 shown in FIG. 11 can include different layers and/or additional layers. In one example, the luminescent label 1100 shown in FIG. 11 can be associated with an indicator (e.g., the indicator 1002). Therefore, the first fluorophore layer 202e, the second fluorophore layer 202f and the third fluorophore layer 202g can be employed to create unique side-emitting fluorophore-based labels. This can be useful for packaged sensors where an outside wall penetration must be minimized for strenuous environmental testing purposes. Furthermore, the first fluorophore layer 202e, the second fluorophore layer 202f and the third fluorophore layer 202g can allow color addition, color subtraction, color isolation and/or output light control to be incorporated into a single luminescent label (e.g., the luminescent label 1100).

The first fluorophore layer 202e, the second fluorophore layer 202f and the third fluorophore layer 202g can each receive the light 108. The first fluorophore layer 202e can, for example, directly receive the light 108, the second fluorophore layer 202f can, for example, receive the light 108 via an opening 1102 (e.g., an aperture 1102), and the third fluorophore layer 202g can, for example, receive the light 108 via an opening 1104 (e.g., an aperture 1104) and an opening 1106 (e.g., an aperture 1106). In one example, the first fluorophore layer 202e can be configured to emit first output light 110, the second fluorophore layer 202f can be configured to emit second output light 110, and/or the third fluorophore layer 202g can be configured to emit third output light 110. For example, the first fluorophore layer 202e can be configured to emit output light 110 associated with a first color, the second fluorophore layer 202f can be configured to emit output light 110 associated with a second color, and/or the third fluorophore layer 202g can be configured to emit output light 110 associated with a third color. The output light 110 can be emitted in plurality of directions from the luminescent label 1100 (e.g., via the substrate layers 204e-g). For example, in the embodiment shown in FIG. 11, the substrate layers 204e-g will emit light to a left side, a right side, a near side and a far side of the luminescent label 1100. In addition, the third substrate layer 204g will emit light up from a top surface of the luminescent label 1100. Accordingly, the output light 110 can be emitted (e.g., by the first fluorophore layer 202e, the second fluorophore layer 202f and the third fluorophore layer 202g) from more than one surface of the luminescent label 1100.

Figure 12:
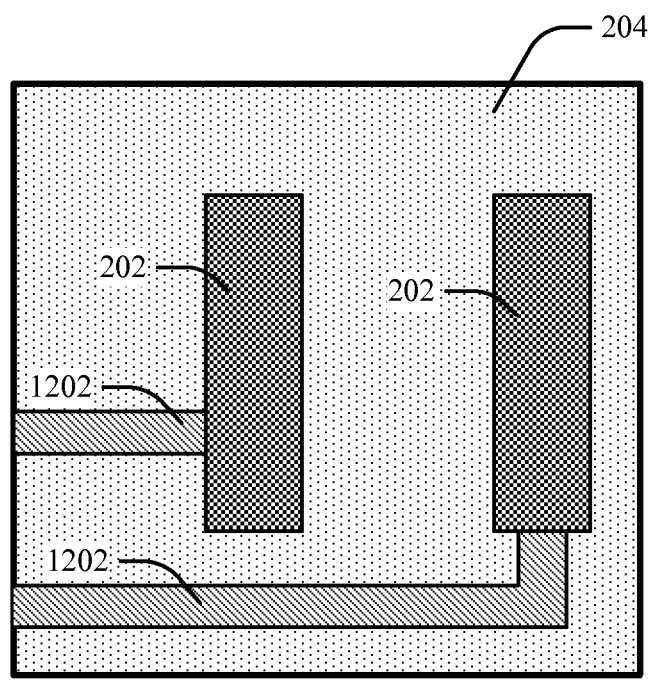
FIG. 12 illustrates a bottom-view of an exemplary luminescent label comprising a waveguide layer.

FIG. 12 illustrates an example substrate layer of a luminescent label (e.g., a bottom-view of an exemplary substrate layer of a luminescent label). In the embodiment shown in FIG. 12, the fluorophore layer 202 is applied to the substrate layer 204. Additionally, a waveguide layer 1202 (e.g., one or more waveguide layers 1202) can be applied to the substrate layer 204 (e.g., a bottom surface of the substrate layer 204). The waveguide layer 1202 can be a light guide (e.g., a planar light guide) of a luminescent label associated with the fluorophore layer 202 (e.g., the luminescent label 104, etc.) that assists routing of light to fluorophore layers. For example, the waveguide layer 1202 can guide the light 108 to the fluorophore layer 202. The substrate layer 204 and the waveguide layer 1202 can be a clear (e.g., transparent) layer. However, the waveguide layer 1202 can comprise a refractive index that is higher than a refractive index of the substrate layer 204. For example, the waveguide layer 1202 can be a transparent conduit (e.g., a clear printed medium) that comprises a different refractive index than the substrate layer 204. Therefore, the waveguide layer 1202 can guide light (e.g., light 108) from a particular location on a luminescent label associated with the fluorophore layer 202 (e.g., the luminescent label 104, etc.) to another spot on the luminescent label associated with the fluorophore layer 202 (e.g., the luminescent label 104, etc.). For example, the waveguide layer 1202 can guide light (e.g., light 108) to the fluorophore layer 202. In one example, the waveguide layer 1202 can be employed for side-emitting and/or side-injecting applications. A luminescent label associated with the waveguide layer 1202 can be associated with an industrial application (e.g., an optical sensor, industrial equipment, industrial automation equipment, industrial indicators, industrial instrumentation, etc.).

Figure 13:
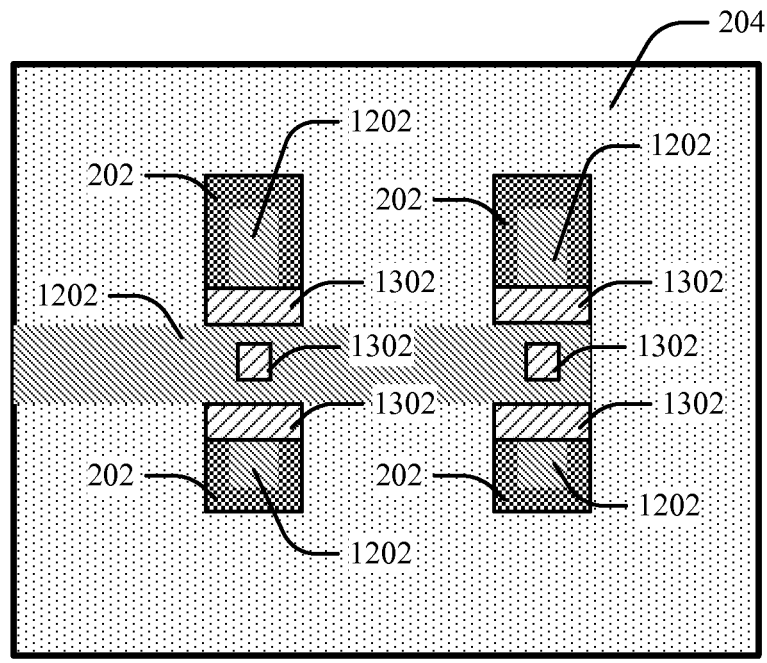
FIG. 13 illustrates a bottom-view of an exemplary luminescent label comprising a control signal layer.

FIG. 13 illustrates an example substrate layer of a luminescent label (e.g., a bottom-view of an exemplary substrate layer of a luminescent label). In the embodiment shown in FIG. 13, the fluorophore layer 202 and/or the waveguide layer 1202 is applied to the substrate layer 204. Additionally, a control signal layer 1302 (e.g., one or more control signal layers 1302) can be applied to the substrate layer 204. The fluorophore layer 202 can be configured as a distribution pattern printed on the substrate layer 204. The control signal layer 1302 can be associated with material that is applied to each branch point associated with the distribution pattern of the fluorophore layer 202. The material of the control signal layer 1302 can react to particular (e.g., different) wavelengths of light (e.g., control signals). In one example, a particular wavelength of light (e.g., a control signal) can be transmitted with the output light 110 generated by the fluorophore layer 202. In response to the control signal layer 1302 being activated by a particular wavelength of light (e.g., a control signal), the control signal layer 1302 can become absorbing or reflective to a particular range of wavelengths (e.g., all wavelengths). In an implementation, a particular light source from a set of light sources (e.g., LEDs) can be selected for a particular portion of a fluorophore layer 202 based on the control signal layer 1302. A luminescent label associated with the control signal layer 1302 can be associated with an industrial application (e.g., an optical sensor, industrial equipment, industrial automation equipment, industrial indicators, industrial instrumentation, etc.).

Figure 14:
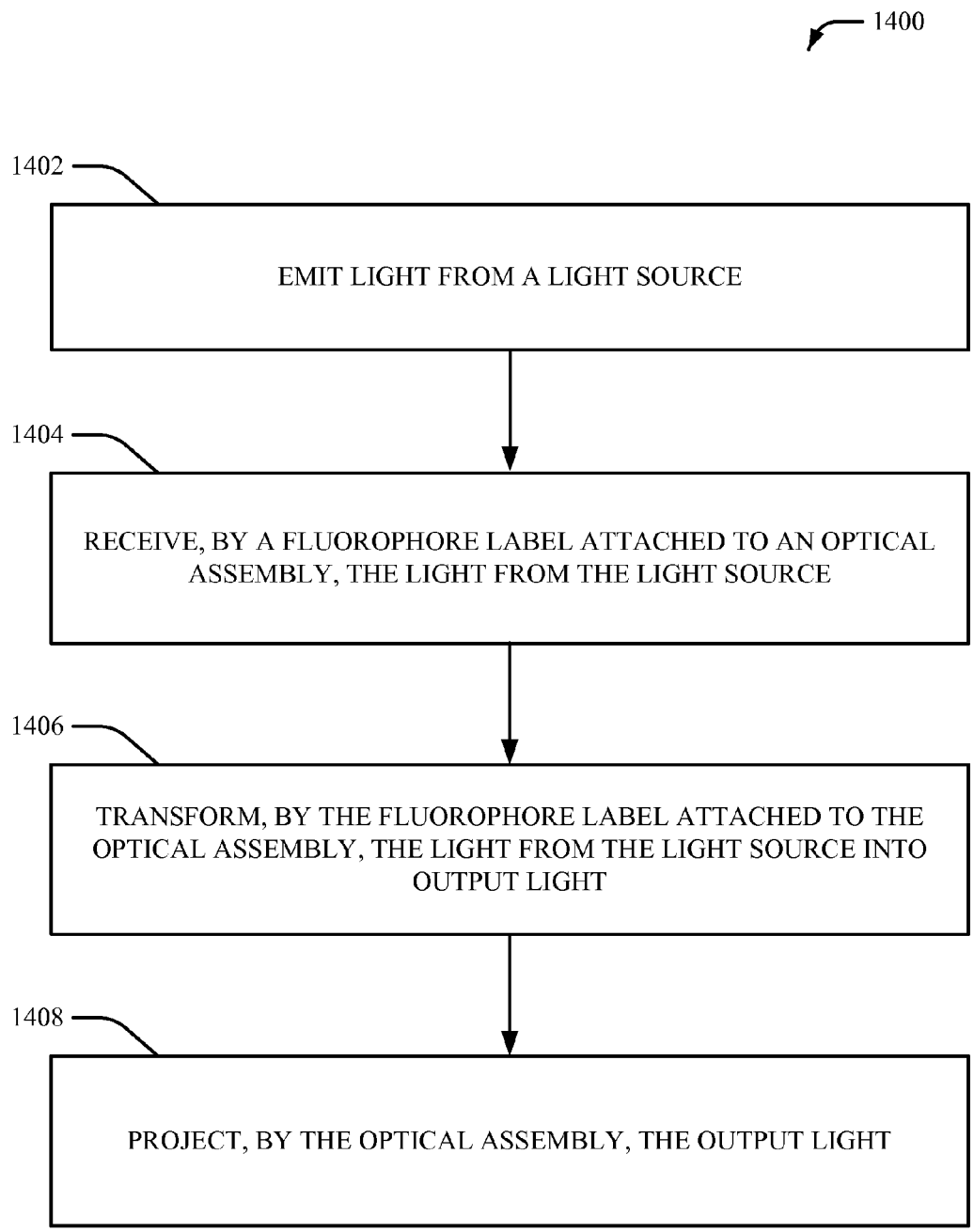
FIG. 14 is a flowchart of an example methodology for employing an auxiliary source in an optical system.
Figure 15:
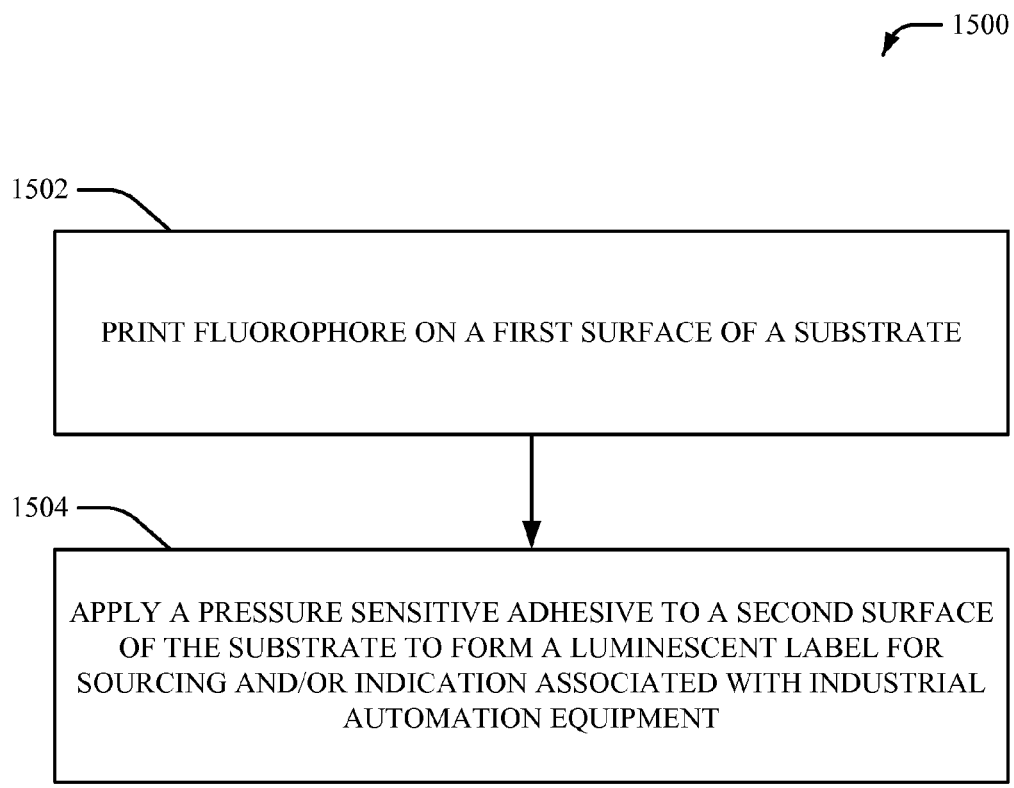
FIG. 15 is a flowchart of an example methodology for creating a luminescent label.

FIGS. 14 and 15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for employing an auxiliary source in an optical system. Initially, at 1402, light (e.g., light 108) from a light source is emitted. The light source can be an LED, a laser or a phosphor emitter light source. In one example, the light source can be a remote light source.

At 1404, the light from the light source is received by a fluorophore label (e.g., luminescent label 104, etc.) attached to an optical assembly. For example, the fluorophore label can comprise fluorophore that is applied to a substrate (e.g., a clear substrate or a translucent substrate). In one example, the substrate of the fluorophore label can be mechanically attached to the optical assembly. In another example, the fluorophore label can be attached to the optical assembly via a pressure sensitive adhesive applied to the substrate. Additionally, the fluorophore label can comprise a mask layer, a metal layer, a waveguide layer and/or a control signal layer.

At 1406, the light from the light source is transformed into output light (e.g., output light 110) by the fluorophore label attached to the optical assembly. For example, the output light generated by the fluorophore label can be associated with one or more visual colors that are different than a visual color associated with the light from the light source. Additionally, the output light generated by the fluorophore label can be a more uniformly distributed light beam than the light received from the light source At 1408, the output light is projected by the optical assembly. For example, the optical assembly can be associated with an optical sensor employed for detecting distance, presence or absence of an object (e.g., an object associated with an industrial automation process). As such, the output light can be projected by an emitter lens associated with an optical sensor. Alternatively, the optical assembly can be associated with another type of industrial application. For example, the optical assembly can be associated with an industrial lighting application (e.g., an industrial indicator, industrial instrumentation, etc.). Therefore, the output light can be projected by, for example, an industrial indicator, industrial instrumentation, etc.

FIG. 15 illustrates an example methodology 1500 for creating a luminescent label. Initially, at 1502, fluorophore is printed on a first surface of a substrate. In an aspect, opaque material (e.g., a mask) can additionally be printed on the first surface of the substrate.

At 1504, pressure sensitive adhesive is applied to a second surface of the substrate to form a luminescent label for sourcing and/or indication associated with industrial automation equipment. In one example, the luminescent label can be attached to an optical assembly (e.g., an optical sensor) associated with detecting distance, presence or absence of an object in industrial automation applications. In another example, the luminescent label can be attached to an indicator associated with industrial automation applications (e.g., the luminescent label can be employed as a light source for indicator lights and/or signage associated with industrial automation applications).

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

What is claimed is:

1. A system, comprising:
   an optical assembly that supports a lens; and
   a luminescent label that is attached to an outer plane of the optical assembly via a pressure sensitive adhesive, and covers an aperture formed in the outer plane of the optical assembly, wherein the aperture formed in the outer plane receives light from a light source external from the optical assembly, and wherein the luminescent label comprises at least a fluorophore layer configured to transform the light received via the aperture formed in the outer plane into output light that is projected by the lens of the optical assembly.

2. The system of claim 1, wherein the fluorophore layer is printed onto a surface of a substrate of the luminescent label.

3. The system of claim 1, wherein the fluorophore layer of the luminescent label is applied to a clear substrate of the luminescent label.

4. The system of claim 2, wherein a mask layer associated with a mask pattern is further applied to the substrate of the luminescent label.

5. The system of claim 1, wherein a first layer of the luminescent label comprises the fluorophore layer and a second layer of the luminescent label comprises the pressure sensitive adhesive.

6. The system of claim 2, wherein the substrate is a rigid substrate.

7. The system of claim 1, wherein the luminescent label is attached to an optical shroud of the optical assembly via a mechanical technique.

8. The system of claim 1, wherein an adhesive layer of the luminescent label that comprises the pressure sensitive adhesive is attached to the optical assembly, and the adhesive layer covers the aperture of the optical assembly.

9. The system of claim 1, wherein at least the fluorophore layer is applied to a metal layer of the luminescent label.

10. The system of claim 1, wherein the light source is a light-emitting diode.

11. The system of claim 1, wherein the light source is a remote light source that transmits the light to the luminescent label via a light guide.

12. The system of claim 11, wherein the light guide further transmits the light to another luminescent label associated with an industrial indicator that comprises at least another fluorophore layer.

13. The system of claim 1, wherein the luminescent label comprises at least a first fluorophore layer configured to transform the light received from the light source into first output light and a second fluorophore layer configured to transform the light received from the light source into second output light.

14. The system of claim 1, wherein the luminescent label comprises at least one waveguide layer to guide the light received from the light source to the fluorophore layer.

15. An apparatus, comprising:
   a fluorophore layer that comprises fluorophore to transform light, received from an external light source external to an optical assembly that supports a lens, into transformed light, wherein the transformed light is received by an aperture in an outer plane of the optical assembly, and wherein the transformed light is transmitted as output light for an industrial application via the lens of the optical assembly; and
   a substrate layer attached to the fluorophore layer and a pressure sensitive adhesive layer, wherein a first surface of the substrate layer is attached to the fluorophore layer, and a second surface of the substrate is attached to the pressure sensitive adhesive layer.

16. The apparatus of claim 15, further comprising a mask layer applied to the substrate layer.

17. The apparatus of claim 15, further comprising a mask layer applied to the fluorophore layer.

18. The apparatus of claim 15, wherein the fluorophore layer is applied to a mask layer.

19. An apparatus, comprising:
   a pressure sensitive adhesive (PSA) layer; and
   a fluorophore layer applied to a surface of the PSA layer, wherein the fluorophore layer comprises fluorophore to transform light, received from a light source external from an optical assembly, into output light for an industrial application, wherein the fluorophore layer is distinct from the PSA layer, and wherein the PSA layer and the fluorophore layer cover an aperture in an outer plane of the optical assembly.

20. The apparatus of claim 19, further comprising a clear substrate attached to the PSA layer.

* * * * *